United States Patent
Abari (12)

(10) Patent No.: US 12,032,102 B2
(45) Date of Patent: Jul. 9, 2024

(54) REAL-TIME SENSOR CALIBRATION AND CALIBRATION VERIFICATION BASED ON DETECTED OBJECTS

(71) Applicant: Pony AI Inc., Grand Cayman (KY)

(72) Inventor: Cyrus F. Abari, San Bruno, CA (US)

(73) Assignee: Pony AI Inc., Grand Cayman (KY)

( * ) Notice: Subject to any disclaimer, the term of this patent is extended or adjusted under 35 U.S.C. 154(b) by 953 days.

(21) Appl. No.: 17/038,927

(22) Filed: Sep. 30, 2020

(65) Prior Publication Data

US 2022/0066006 A1   Mar. 3, 2022

Related U.S. Application Data

(60) Provisional application No. 63/069,919, filed on Aug. 25, 2020.

(51) Int. Cl.
*G01S 7/497* (2006.01)
*G01S 17/86* (2020.01)
*G01S 17/89* (2020.01)
*G01S 17/931* (2020.01)

(52) U.S. Cl.
CPC .......... *G01S 7/4972* (2013.01); *G01S 7/497* (2013.01); *G01S 17/86* (2020.01); *G01S 17/89* (2013.01); *G01S 17/931* (2020.01)

(58) Field of Classification Search
CPC ...... G01S 7/497; G01S 17/931; G01S 17/894; G01S 7/4817; G01S 17/10; G01S 19/13
See application file for complete search history.

(56) References Cited

U.S. PATENT DOCUMENTS

| 10,724,865 B1* | 7/2020 | Ferguson | G01S 17/86 |
| 2020/0018618 A1* | 1/2020 | Ozog | G01S 7/52004 |
| 2020/0025935 A1* | 1/2020 | Liang | G06V 20/64 |
| 2021/0225032 A1* | 7/2021 | Hain | G06T 7/73 |

FOREIGN PATENT DOCUMENTS

WO  WO-2020168464 A1 *  8/2020  ......... G01C 21/3815

OTHER PUBLICATIONS

Ilci, V.; Toth, C. High Definition 3D Map Creation Using GNSS/IMU/LiDAR Sensor Integration to Support Autonomous Vehicle Navigation. Sensors 2020, 20, 899. https://doi.org/10.3390/s20030899 (Year: 2020).*

* cited by examiner

*Primary Examiner* — Isam A Alsomiri
*Assistant Examiner* — Joseph C Fritchman
(74) *Attorney, Agent, or Firm* — Sheppard, Mullin, Richter & Hampton LLP; Xin Xie

(57) ABSTRACT

Improved calibration of a vehicle sensor based on static objects detected within an environment being traversed by the vehicle is disclosed. A first sensor such as a LiDAR can be calibrated to a global coordinate system via a second pre-calibrated sensor such as a GPS IMU. Static objects present in the environment are detected such as signage. Point cloud data representative of the static objects are captured by the first sensor and a first transformation matrix for performing a transformation from a local coordinate system of the first sensor to a local coordinate system of the second sensor is iteratively redetermined until a desired calibration accuracy is achieved. Transformation to the global coordinate system is then achieved via application of the first transformation matrix followed by application of a second known transformation matrix to transition from the local coordinate system of the second pre-calibrated sensor to the global coordinate system.

19 Claims, 7 Drawing Sheets

REAL-TIME SENSOR CALIBRATION AND CALIBRATION VERIFICATION BASED ON DETECTED OBJECTS

CROSS-REFERENCE TO RELATED APPLICATION(S)

This application claims the benefit under 35 U.S.C. 119(e) of U.S. Provisional Application No. 63/069,919, filed on Aug. 25, 2020, the content of which is hereby incorporated in its entirety.

FIELD OF THE INVENTION

The present invention relates generally to sensor calibration, and more particularly, in some embodiments, to real-time calibration of a sensor and calibration verification using detected static objects.

BACKGROUND

On-board sensors in a vehicle, such as an autonomous vehicle, supplement and bolster the vehicle's field-of-view (FOV) by providing continuous streams of sensor data captured from the vehicle's surrounding environment. Sensor data is used in connection with a diverse range of vehicle-based applications including, for example, blind spot detection, lane change assisting, rear-end radar for collision warning or collision avoidance, park assisting, cross-traffic monitoring, brake assisting, emergency braking, and automated distance control.

On-board sensors include, for example, cameras, light detection and ranging (LiDAR) systems, radar-based systems, Global Positioning System (GPS) devices, sonar-based sensors, ultrasonic sensors, inertial measurement units (IMUs), accelerometers, gyroscopes, magnetometers, and far infrared (FIR) sensors. Sensor data may include image data, reflected laser data, or the like. Often, images captured by on-board sensors utilize a three-dimensional (3D) coordinate system to determine the distance and angle of objects in the image with respect to each other and with respect to the vehicle. In particular, such real-time spatial information may be acquired near a vehicle using various on-board sensors located throughout the vehicle, which may then be processed to calculate various vehicle parameters and determine safe driving operations of the vehicle.

An autonomous vehicle performs a myriad of complex calculations based on the sensor data captured from on-board vehicle sensors to facilitate various operations required for autonomous vehicle operation such as object detection, object classification, object tracking, collision avoidance, vehicle navigation, vehicle acceleration and deceleration, and the like. In order to ensure that such operations are performed in accordance with the stringent safety standards required of autonomous vehicles, the calculations must have a high degree of accuracy which, in turn, requires that the sensor data on which the calculations are based have a high level of precision and accuracy. The precision and accuracy of the sensor data depends, in turn, on the sensors that capture the sensor data being properly calibrated. Discussed herein are technical solutions that address technical problems associated with sensor calibration, in particular, calibration of sensors associated with vehicles such as autonomous vehicles.

SUMMARY

In an example embodiment, a computer-implemented method for calibrating a first sensor associated with a vehicle using detected objects is disclosed. The computer-implemented method includes detecting a static object in an environment being traversed by the vehicle and capturing, via the first sensor, point cloud data, at least a portion of which is associated with the detected static object. The method further includes calibrating, with respect to the point cloud data, the first sensor to a global coordinate system via a second sensor associated with the vehicle, wherein the second sensor has been pre-calibrated to the global coordinate system.

In an example embodiment, calibrating the first sensor to the global coordinate system includes determining a transformation matrix from a first local coordinate system of the first sensor to a second local coordinate system of the second sensor.

In an example embodiment, determining the transformation matrix includes determining at least one rotational component and at least one translational component of the transformation matrix.

In an example embodiment, the at least one rotational component and the at least one translational component align the at least a portion of the point cloud data with a location of the detected static object within the global coordinate system as a relative position of the vehicle changes with respect to the detected static object.

In an example embodiment, calibrating the first sensor includes determining whether the transformation matrix results in a calibration accuracy for the first sensor that is within a calibration accuracy threshold.

In an example embodiment, the transformation matrix is a first transformation matrix, and calibrating the first sensor to the global coordinate system further includes determining, based at least in part on the at least a portion of the point cloud data associated with the detected static object, a location of the detected static object in the first local coordinate system; applying the first transformation matrix to the location of the detected static object in the first local coordinate system to obtain a corresponding location of the detected static object in the second local coordinate system; applying a second transformation matrix to the corresponding location of the detected static object in the second local coordinate system to obtain a location of the detected static object in the global coordinate system; and determining the calibration accuracy of the calibration of the first sensor based at least in part on a deviation between the determined location of the detected static object in the global coordinate system obtained via application of the first transformation matrix and the second transformation matrix and a prior determined location of the detected static object in the global coordinate system obtained via application of the second transformation matrix and a prior iteration of the first transformation matrix.

In an example embodiment, determining whether the transformation matrix results in a calibration accuracy for the first sensor that is within a calibration accuracy threshold includes determining that the calibration accuracy for the first sensor is not within the calibration accuracy threshold, the at least a portion of the point cloud data associated with the detected static object is a first portion of the point cloud data, and the method further includes detecting a second static object in an environment being traversed by the vehicle, where a second portion of the point cloud data is associated with the detected second static object; redetermining the transformation matrix with respect to the second portion of the point cloud data; and redetermining the calibration accuracy for the first sensor based at least in part on the redetermined transformation matrix.

In an example embodiment, the method further includes determining a calibration error associated with the first sensor subsequent to calibrating the first sensor, determining that the calibration error exceeds a threshold acceptable calibration error, and re-calibrating the first sensor responsive, at least in part, to determining that the calibration error exceeds the threshold acceptable calibration error.

In an example embodiment, the method further includes prior to calibrating the first sensor, identifying data indicative of a set of environmental conditions in the environment being traversed by the vehicle; determining that the set of environmental conditions satisfies one or more criteria for optimal calibration of the first sensor; and initiating calibration of the first sensor responsive, at least in part, to determining that the set of environmental conditions satisfies the one or more criteria for optimal calibration of the first sensor.

In an example embodiment, the data indicative of the set of environmental conditions includes at least one of: i) third-party data indicative of one or more of a weather condition, a time of day, or a density of static objects in a portion of the environment or ii) sensor data from at least a third sensor associated with the vehicle, wherein the third sensor comprises one or more of a moisture sensor, a heat sensor, or a vibration sensor.

In an example embodiment, the first sensor is a LiDAR sensor and the second sensor is an inertial sensor such as an IMU associated with a GPS device.

In an example embodiment, a system for calibrating a first sensor associated with a vehicle using detected objects is disclosed. The system includes at least one processor and at least one memory storing computer-executable instructions. The at least one processor is configured to access the at least one memory and execute the computer-executable instructions to perform a set of operations including detecting a static object in an environment being traversed by the vehicle; capturing, via the first sensor, point cloud data, at least a portion of which is associated with the detected static object; and calibrating, with respect to the point cloud data, the first sensor to a global coordinate system via a second sensor associated with the vehicle, wherein the second sensor has been pre-calibrated to the global coordinate system.

The above-described system is further configured to perform any of the operations/functions and may include any of the additional features/aspects of example embodiments of the invention described above in relation to example computer-implemented methods of the invention.

In an example embodiment, a computer program product for calibrating a first sensor associated with a vehicle using detected objects is disclosed. The computer program product includes a non-transitory computer-readable medium readable by a processing circuit. The non-transitory computer-readable medium stores instructions executable by the processing circuit to cause a method to be performed. The method includes detecting a static object in an environment being traversed by the vehicle; capturing, via the first sensor, point cloud data, at least a portion of which is associated with the detected static object; and calibrating, with respect to the point cloud data, the first sensor to a global coordinate system via a second sensor associated with the vehicle, wherein the second sensor has been pre-calibrated to the global coordinate system.

The above-described computer program product is further configured to perform any of the operations/functions and may include any of the additional features/aspects of example embodiments of the invention described above in relation to example computer-implemented methods of the invention.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Overview

Figure 1A:
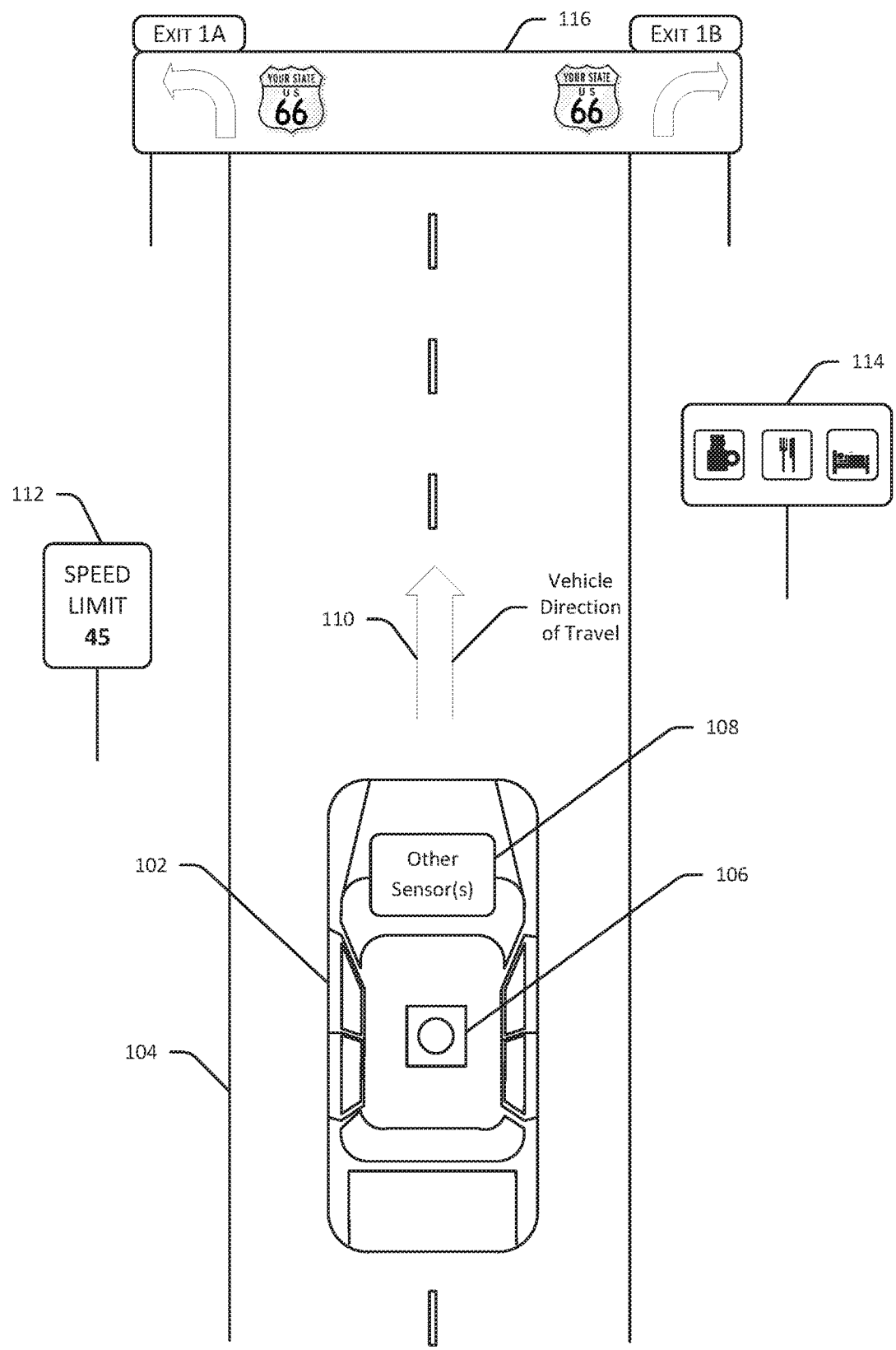
FIG. 1A graphically illustrates use of object perception to detect static objects such as roadway signs in an environment being traversed by a vehicle and calibration of a vehicle sensor such as a LiDAR using the detected static objects in accordance with an example embodiment of the invention.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

In general, a vehicle may be equipped with a myriad of onboard sensors. Such sensors can be disposed on an exterior or in an interior of the vehicle and can include, without limitation, LiDAR sensors, radars, cameras, GPS receivers, sonar-based sensors, ultrasonic sensors, IMUs, accelerometers, gyroscopes, magnetometers, FIR sensors, and so forth. Such sensors play a central role in the functioning and operation of autonomous, semi-autonomous, and driverless vehicles, for example. As used herein, an autonomous vehicle may refer to a vehicle that is capable of operating in a fully autonomous driving mode in which no manual human input is required for the vehicle to perform driving functions. In some example embodiments, an autonomous vehicle may be operated as a driverless vehicle. For instance, in some example embodiments, an autonomous vehicle may be operated without any occupants in the vehicle. In other example embodiments, an autonomous vehicle may be include one or more passive vehicle occupants (e.g., vehicle occupants who are not provided with the capability to take over manual driving control of the vehicle). For example, such vehicle occupants may be passengers being transported by an autonomous vehicle operated in connection with an autonomous vehicle ride-sharing service. In still other example embodiments, an autonomous vehicle may include a vehicle occupant who is provided with a capability to provide input/commands to manually engage one or more driving functions of the autonomous vehicle. In yet other example embodiments, a vehicle may be a semi-autonomous vehicle adapted to perform some but not all driving functions fully autonomously. That is, a semi-autonomous vehicle may be able to operate fully autonomously under certain driving conditions (e.g., above a threshold speed, below a threshold amount of traffic density, etc.), but may require a human operator for operation in other circumstances/scenarios in which autonomous capabilities are not available (e.g., driving on poorly marked roadways). While example embodiments of the invention may be described herein in relation to autonomous vehicles, it should be appreciated that embodiments of the invention are applicable to vehicles having any level of autonomous operating capabilities.

In example embodiments, onboard sensors associated with an autonomous vehicle may include LiDARs, which can be utilized to detect objects (e.g., other vehicles, road signs, pedestrians, buildings, etc.) in an environment being traversed by the vehicle. LiDARs can also be utilized to determine relative distances between objects in the environment and between objects and the vehicle. As another non-limiting example, radars can be utilized in connection with collision avoidance, adaptive cruise control, blind spot detection, assisted parking, and other vehicle applications. As yet another non-limiting example, cameras can be utilized to recognize, interpret, and/or identify objects captured in images or visual cues of the objects. Data collected from these sensors can be processed and used as inputs to algorithms configured to make various autonomous driving decisions including decisions relating to when and how much to accelerate, decelerate, change direction, or the like.

In various example embodiments of the invention, the myriad of on-board sensors provide continuous streams of sensor data that, in turn, are provided as input to algorithms that perform complex calculations in order to facilitate a multitude of operations required for safe autonomous vehicle operation such as object detection, object classification, object tracking, collision avoidance, vehicle navigation, vehicle acceleration and deceleration, and the like. In order to ensure that such operations are performed in accordance with the stringent safety standards required of autonomous vehicles, the calculations performed by autonomous vehicles must have a high degree of precision and accuracy which, in turn, requires that the sensor data on which the calculations are based have a high level of precision and accuracy. The precision and accuracy of the sensor data depends, in turn, on the sensors that capture the sensor data being properly calibrated.

Discussed herein are technical solutions that address technical problems associated with conventional sensor calibration, in particular, calibration of sensors associated with vehicles such as autonomous vehicles. Conventionally, calibration of a vehicle sensor such as a LiDAR is performed by operating a vehicle in a confined environment such that the LiDAR can capture point cloud data from a particular object present in the environment that is pre-selected to serve as a basis for calibration of the LiDAR to a global coordinate system. For instance, in a conventional calibration scenario, an autonomous vehicle may be operated according to a predetermined travel path (e.g., a FIG. 8 pattern) within a confined environment. During operation of the vehicle according to the predetermined travel path, the LiDAR sensor may periodically scan the confined environment and emit light pulses that are reflected back from the pre-selected object and captured as point cloud data. The pre-selected object may be, for example, a wall or other substantially flat structure deemed suitable for sensor calibration. Over time, the LiDAR may be calibrated based on the captured point cloud data until a desired calibration accuracy is achieved according to which the point cloud data maintains alignment with a fixed location of the pre-selected object within a global coordinate system.

This conventional methodology for calibrating a vehicle sensor such as a LiDAR, however, suffers from various technical drawbacks. In particular, this conventional methodology requires expending additional resources in the form of the additional time and energy expenditure required to operate the vehicle solely for calibration purposes. This additional expenditure of resources presents an opportunity cost because the expended resources could otherwise be spent dispatching the vehicle to, for example, collect sensor data that can be used to refine static maps of an environment, improve autonomous driving capabilities, or the like.

Various embodiments of the invention overcome technical problems specifically arising in the realm of computer-based technology, and more specifically, in the realm of autonomous vehicle technology. In particular, example embodiments of the invention provide technical solutions to the above-described technical problem associated with conventional calibration techniques by providing systems, methods, non-transitory computer-readable media, techniques, and methodologies for improved sensor calibration that do not require additional expenditure of resources.

Figure 1B:
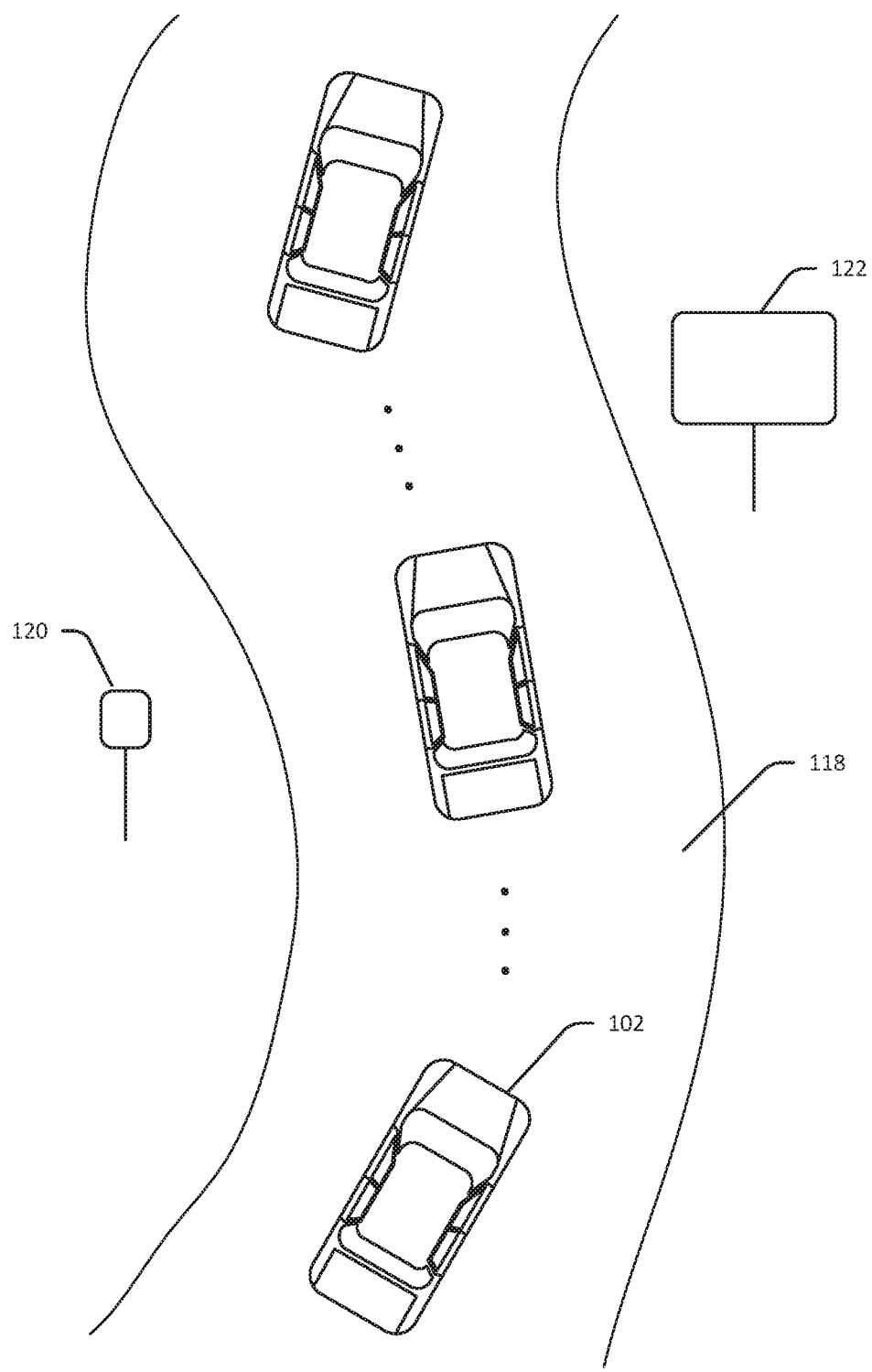
FIG. 1B graphically illustrates an alternative environment being traversed by a vehicle in which detected static objects can be used in connection with calibration of a vehicle sensor such as a LiDAR in accordance with an example embodiment of the invention.

More specifically, example embodiments of the invention provide calibration techniques whereby a first sensor (e.g., a LiDAR) is calibrated to a global coordinate system via a second sensor (e.g., a GPS IMU) that has been pre-calibrated to the global coordinate system. As shown in FIG. 1A, in example embodiments, a vehicle 102 such as an autonomous vehicle can be dispatched as it typically would be within an environment. More specifically, the vehicle 102 may traverse one or more road segments (e.g., road segment 104) within the environment. For ease of depiction, the road segment 104 and a direction of travel 110 of the vehicle 102 along the road segment 104 are each depicted in FIG. 1A as being substantially linear. However, it should be appreciated that the road segment 104 may form part of a larger roadway that includes any number of linear portions and/or non-linear portions having any degree of curvature. For example, as shown in FIG. 1B, a roadway that includes the linear road segment 104 depicted in FIG. 1A may also include a non-linear road segment 118 having any type of curvature. Thus, the vehicle 102 may traverse a variety of road segments in the environment having any degree of linearity and/or non-linearity. Further, it should be appreciated that the vehicle's direction of travel 110 depicted in FIG. 1A may vary between a range of permissible directions of travel on the road segment 104, and the vehicle's 102 travel path along a roadway that includes, for example, road segments 104 (FIG. 1A) and 118 (FIG. 1B) may include any number of turns, reversals of travel direction, deviations from a linear travel direction, or the like.

The environment traversed by the vehicle 102 may include various static objects such as signage present on the side of a roadway (e.g., speed limit signage 112, food/lodging signage 114, etc.) or signage extending over or above the roadway (e.g., overhead highway signage 116). The signage encountered in the environment being traversed by the vehicle 102 may vary in size, height, and shape. As will be described in more detail later in this disclosure, performing sensor calibration using detected objects such as detected signs across a range of sizes and heights may result in a faster statistical convergence to a desired calibration accuracy. Example signage 120, 122 having different sizes and heights is illustratively depicted in FIG. 1B. While not depicted in FIGS. 1A and 1B, other examples of static objects in the environment may include, for example, physical structures such as buildings, monuments, landmarks, or the like; naturally occurring static objects such as trees, bushes, or the like; and so forth. As used herein, a static object refers to an object that is not designed for movement, either of its own volition such as a pedestrian, animal, or the like, or as a result of locomotive power supplied to the object such as a vehicle. A static object, however, is not prohibited from experiencing some degree of movement due to an externally applied force (e.g., a sign or a tree moving slightly due to wind forces).

In example embodiments, the vehicle 102 may be any object capable of generating locomotive power from an energy source. The energy source may be a liquid fuel such as gasoline or compressed natural gas (CNG); hydrogen fuel cells; electricity such as from one or more batteries; solar energy; biomass; or any other suitable source of energy. The vehicle 102 can be any type of vehicle including, without limitation, a car; a truck; a bus; a motorcycle; an all-terrain vehicle; or the like. The vehicle 102 may be a fully autonomous vehicle, a driverless vehicle, a semi-autonomous vehicle, or the like.

In example embodiments, the vehicle 102 may include various onboard vehicle sensors. These sensors may include, for example, a LiDAR sensor 106 as well as various other sensors 108. The other sensors 108 may include, for example, inertial sensors (e.g., IMUs, accelerometers, gyroscopes, etc.); heat sensors; moisture sensors; vibration sensors; image sensors; radars; ultrasonic sensors; and so forth. Included among the other sensors 108 may be, for example, a pre-calibrated sensor, such as a GPS IMU, via which the LiDAR 106 may be calibrated in accordance with example embodiments of the invention.

The various sensors onboard the vehicle 102 may be provided on an exterior and/or an interior of the vehicle 102. The LiDAR 106 may, for example, be provided on a roof of the vehicle 102. The LiDAR 106 may be configured to periodically perform a 360 degree scan of the surrounding environment, and as such, placing the LiDAR 106 on the roof of the vehicle 102 may optimize the amount of point cloud data that can be captured by the LiDAR 106. The various onboard vehicle sensors may be physically integrated with the vehicle 102 during manufacture of the vehicle 102 or may be attached or otherwise physically connected to the vehicle 102 subsequent to manufacture of the vehicle 102. The sensors may be communicatively coupled to one or more components (not depicted) of the vehicle 102 such as an electronic control unit (ECC) of the vehicle 102; an on-board vehicle computer; or the like.

In some example embodiments, the LiDAR 106 may be provided as part of a sensor assembly that also includes one or more cameras. In some example embodiments, the sensor assembly may further include other types of sensors such as GPS receivers, IMUs, or the like. That is, in some example embodiments, the LiDAR 106 and at least some of the other sensors 108 may be provided as part of a combined sensor assembly. The sensor assembly may be positioned, for example, on a roof of the vehicle 102. For instance, in an example configuration, the LiDAR sensor 106 may be centrally located on a roof of the vehicle 102 and surrounded by multiple cameras that are positioned circumferentially around the LiDAR sensor 106.

In example embodiments, the LiDAR sensor 106 may periodically rotate through a scan path during which the LiDAR 106 may illuminate objects in the scanned environment with periodic pulses of light and measure the differences in flight times and wavelengths for light that is reflected back to detect the presence of target objects and generate 3D point cloud representations of targets that were illuminated by the light pulses; determine distances between the vehicle 102 and the target objects; determine distances between various target objects; and the like. The LiDAR 106 may exhibit a horizontal scan path and/or a vertical scan path. More specifically, the LiDAR sensor 106 may generate 3D point cloud data (a set of data points in 3D space) that are representative of target objects that it has illuminated with light during its scan path. The objects illuminated with light from the LiDAR 106 may include any of the types of static objects previously described and one or more moving objects such as other vehicles, pedestrians, or the like. In some example embodiments, cameras positioned circumferentially around the LiDAR 106 may capture image data, which may be analyzed using a trained classifier or other machine learning technique to perform object detection/perception to identify and classify objects present in the image data. It should be appreciated that the above-described configuration is merely illustrative and that any number of LiDARs and/or other sensors/sensor assemblies may be provided on-board the vehicle 102.

In example embodiments, as the vehicle 102 traverses the environment, object perception capabilities may be used to detect and identify various static objects encountered by the vehicle 102. The object perception capabilities may be provided by a machine learning algorithm (e.g., a classifier) that is trained to identify and classify objects present in images captured by one or more image sensors, for example. A vehicle sensor requiring calibration (e.g., the LiDAR 106) may capture point cloud data corresponding to detected static objects in the environment such as detected signage. The captured point cloud data may correspond to a variety of static objects of different sizes, shapes, heights, and so forth. A calibration process may be initiated with respect to the captured point cloud data to calibrate the LiDAR 106 via a second pre-calibrated sensor among the other sensors 108 such as a GPS IMU or other inertial vehicle sensor.

The calibration process may include determining a first transformation matrix from a first local coordinate system of the LiDAR sensor 106 to a second local coordinate system of the pre-calibrated GPS IMU, for example. Determining the first transformation matrix may include determining at least one rotational component and at least one translational component of the first transformation matrix. Because the second sensor 108 (e.g., a GPS IMU) has already been calibrated to the global coordinate system, a second transformation matrix from a local coordinate system of the second sensor to the global coordinate system is known. Accordingly, application of the first transformation matrix results in conversion of a location of a detected static object (e.g., represented by corresponding captured point cloud data) in the local coordinate system of the first sensor (e.g., the LiDAR 106) to a corresponding location in the local coordinate system of the second sensor (e.g., the GPS IMU). Then, application of the second transformation matrix results in conversion of the corresponding location in the local coordinate system of the second sensor to a location of the detected static object in the global coordinate system.

In example embodiments, the process for calibrating the first sensor (e.g., the LiDAR 106) may proceed with an iterative redetermination of the first transformation matrix until a desired calibration accuracy is achieved. More specifically, as the vehicle traverses the environment, the first sensor being calibrated may capture multiple sets of point cloud data representative of a detected static object in the environment from various relative distances and perspectives between the first sensor and the static object. The first transformation matrix may be iteratively redetermined for each such point cloud data set, and with each iterative redetermination, an improved alignment between consecutively captured point cloud data corresponding to the detected static object is achieved, thereby indicating improved accuracy of the calibration of the first sensor to the global coordinate system.

In example embodiments, the first transformation matrix is iteratively redetermined with respect to multiple detected static objects in the environment being traversed by the vehicle 102 until a calibration accuracy is achieved for the first sensor (e.g., the LiDAR 106) that is within a desired calibration accuracy threshold. More specifically, in some example embodiments, the calibration process is executed until a calibration error, as represented, for example, by a deviation between a current determined location of a detected static object in the global coordinate system and a prior determined location of the detected static object in the global coordinate system, is less than an acceptable calibration error threshold. A current determined location of a detected static object in the global coordinate system may be obtained by first applying the first transformation matrix to a location of the static object in the local coordinate system of the first sensor (e.g., the LiDAR 106) being calibrated to obtain a corresponding location of the static object in the local coordinate system of a pre-calibrated second sensor 108 (e.g., a GPS IMU), and subsequently applying the known second transformation matrix to the location of the static object in the local coordinate system of the pre-calibrated second sensor, to obtain the location of the static object in the global coordinate system. Similarly, the prior determined location of the static object in the global coordinate system may be obtained by application of a prior iteration of the first transformation matrix first followed by application of the known second transformation matrix.

In some example embodiments, calibration of the first sensor (e.g., the LiDAR 106) may be initiated when environmental conditions are determined to be optimal for the calibration. For instance, third-party data indicative of environmental conditions relating to an environment being traversed by the vehicle 102 may be collected. Such data may include, for example, weather data, time of day data, data indicative of a density of static objects in the environment, and so forth. Additionally, or alternatively, sensor data indicative of environmental conditions may be captured. Such sensor data may be obtained from one or more of the other sensors 108 and may include, for example, data captured by a moisture sensor, a heat sensor, a vibration sensor, or the like. The sensor data indicative of environmental conditions may also include data indicative of a quality of a GPS signal received by the GPS device whose IMU may serve as a basis for calibration of the first sensor; an amount of vibration detected by the GPS IMU; or the like. The data indicative of environmental conditions may be evaluated against various criteria to determine whether an optimal set of conditions are present for initiating sensor calibration.

In some example embodiments, after the first sensor (e.g., the LiDAR 106) is calibrated via a second sensor 108 (e.g., a GPS IMU), a calibration verification process may be performed for the first sensor to ensure that a calibration accuracy of the first sensor is still within the desired calibration accuracy threshold. In example embodiments, the calibration verification process may be triggered in response to a vehicle event involving the vehicle 102 and/or may be performed periodically subsequent to the initial calibration of the first sensor. Vehicle events that may trigger the calibration verification include, for example, a vibrational event that causes a threshold amount of vibration of the vehicle (e.g., driving over a speed bump or pothole); at least a threshold amount of force being exerted on the first sensor as determined from data captured by a force/pressure sensor (e.g., operating the vehicle 102 under high wind conditions); at least a threshold amount of heat present in or near the first sensor as determined by data captured by a heat sensor (e.g., operating the vehicle 102 under high heat conditions); or the like. In some example embodiments, calibration verification of the first sensor may occur periodically after a threshold amount of time has passed since the initial calibration or since a last calibration verification; after the vehicle 102 has traversed a threshold distance; after the vehicle 102 has been operated for a threshold amount of time; and so forth.

In example embodiments, the calibration verification process may include determining a calibration error associated with the first sensor (e.g., the LiDAR 106). As previously noted, determining the calibration error may include, for example, determining a deviation between alignment of different sets of point cloud data representative of a detected static object in the environment of the vehicle 102 and captured at different times (e.g., at different relative distances/perspectives between the vehicle 102 and the detected static object). Stated another way, the calibration error for the first sensor (e.g., the LiDAR 106) may be determined based on a deviation between a determined location of the detected static object within a global coordinate system (as determined from application of a current iteration of the first transformation matrix to perform a transformation from a local coordinate system of the first sensor to a local coordinate system of a second pre-calibrated sensor (e.g., a GPS IMU) followed by application of a second known transformation matrix to perform a transformation from the local coordinate system of the second sensor to the global coordinate system) and a prior determined location of the detected static object within the global coordinate system (as determined from application of a prior iteration of the first transformation matrix followed by application of the second known transformation matrix).

A determination may then be made as to whether the determined calibration error exceeds a threshold acceptable calibration error. This determination may involve determining whether the first sensor (e.g., the LiDAR 106), despite the calibration error, maintains a calibration accuracy that is within the desired calibration accuracy threshold. If the calibration error exceeds the threshold acceptable calibration error, re-calibration of the first sensor may be initiated using the techniques described herein. That is, the first sensor may be re-calibrated via the second pre-calibrated sensor based on which the calibration of the first sensor was initially performed.

Example embodiments of the invention provide technical solutions to technical problems associated with conventional vehicle sensor calibration techniques. In particular, example embodiments of the invention provide improved vehicle sensor calibration techniques that enable calibration of a first vehicle sensor such as a LiDAR via a second pre-calibrated vehicle sensor such as a GPS IMU without having to expend additional resources solely to perform the calibration. More specifically, in accordance with example embodiments, a vehicle such as an autonomous vehicle can be dispatched out into a driving environment as would be typically done. Object perception capabilities are utilized to detect static objects present in the vehicle's environment. Technical features of example embodiments of the invention include capturing, by the first sensor to be calibrated, point cloud data representative of the detected static objects in the environment and iteratively redetermining a first transformation matrix for transforming a position of a detected static object in a local coordinate system of the first sensor (as represented by the corresponding captured point cloud data) to a corresponding location in a local coordinate system of a second sensor that has been pre-calibrated to a global coordinate system.

According to example embodiments, the first transformation matrix can be iteratively redetermined until a desired calibration accuracy is achieved (e.g., a calibration error for the first sensor is less than a threshold acceptable calibration error). Because the second sensor has been pre-calibrated, a second transformation matrix for transforming a location of a detected static object in the local coordinate system of the second sensor to a location in the global coordinate system is known. As such, iterative redetermination of the first transformation matrix until a desired calibration accuracy is achieved permits locations of detected static objects in the local coordinate system of the first sensor to be calibrated to global locations of the detected static objects in the global coordinate system via the known second transformation matrix.

In this manner, a technical solution over technical problems associated with conventional calibration techniques is achieved because a first sensor (e.g., a LiDAR) can be calibrated via a pre-calibrated second sensor (e.g., a GPS IMU) during operation of a vehicle that has been dispatched within a typical operating environment without having to expend additional resources (e.g., time, energy for providing locomotive power to the vehicle, etc.) solely for calibrating the first sensor, as would be required with conventional calibration techniques. This technical solution represents a technological improvement over conventional autonomous vehicle technology, in particular, an improvement over conventional techniques for calibrating vehicle sensors of a vehicle such as an autonomous vehicle.

Illustrative Embodiments

Figure 2:
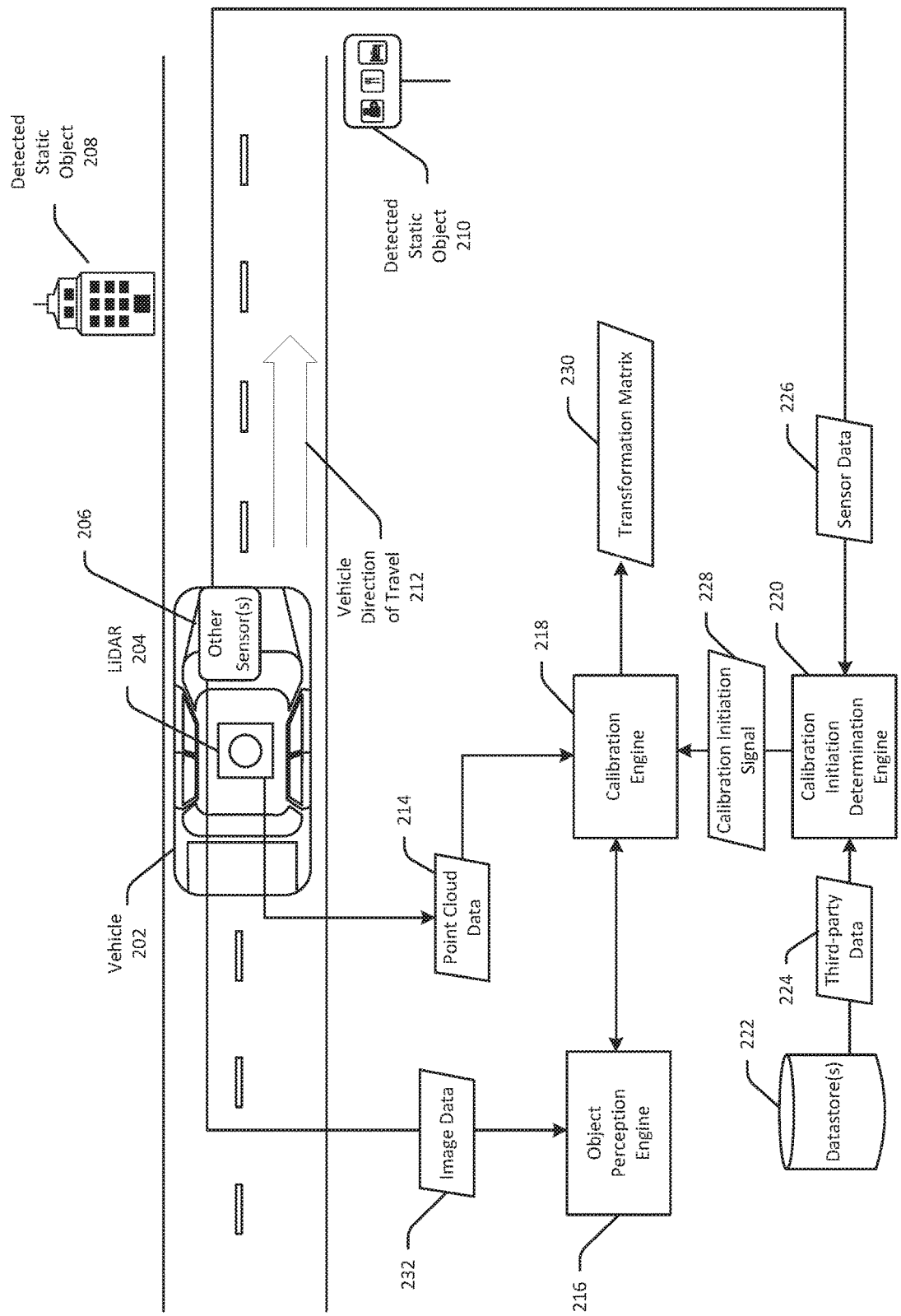
FIG. 2 is a hybrid data flow and block diagram illustrating calibration of a first vehicle sensor such as a LiDAR via a pre-calibrated second sensor such as a GPS IMU using static objects detected in an environment being traversed by a vehicle in accordance with an example embodiment of the invention.
Figure 3:
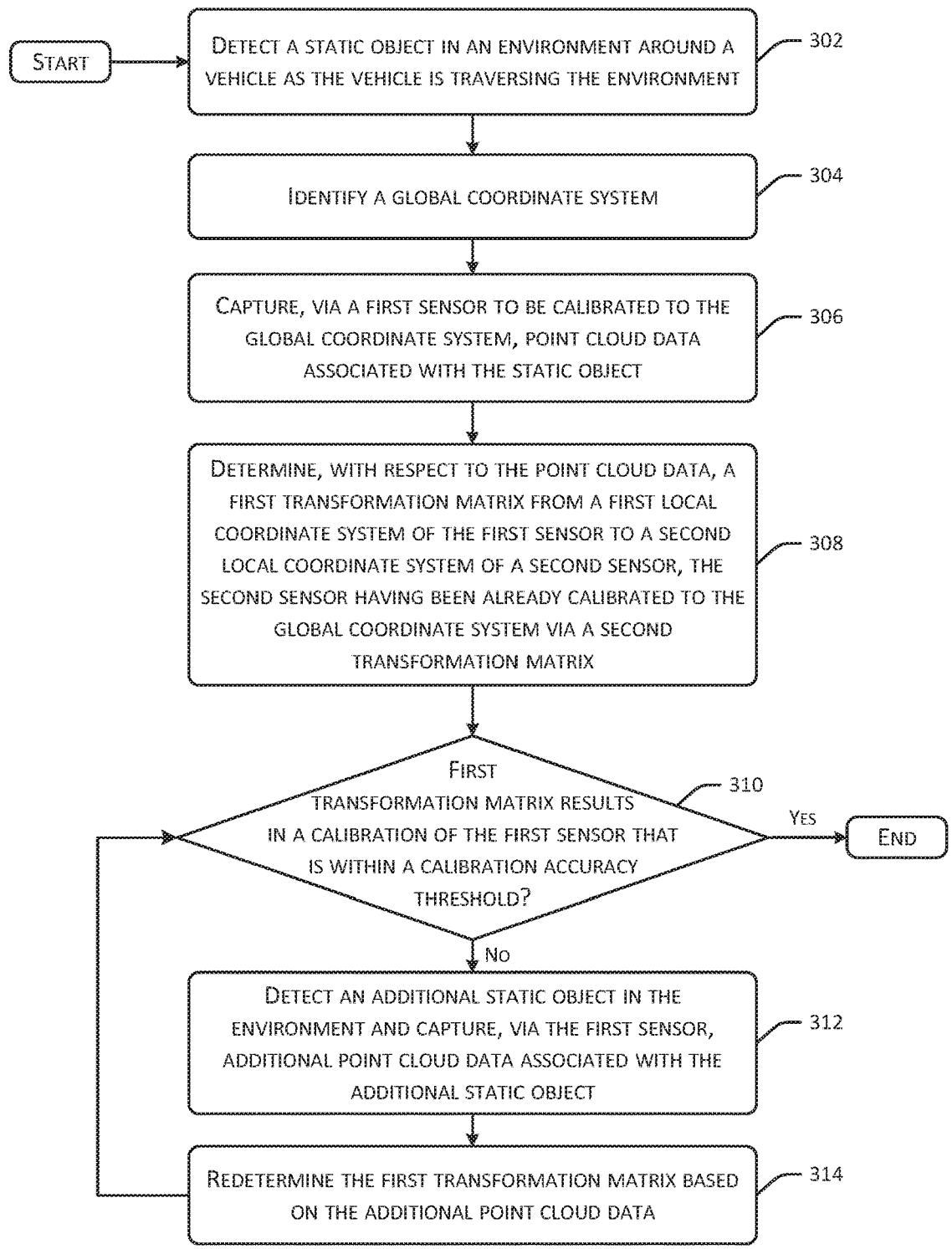
FIG. 3 is a process flow diagram of an illustrative method for calibrating a first vehicle sensor via a pre-calibrated second sensor using static objects detected in an environment being traversed by a vehicle in accordance with an example embodiment of the invention.
Figure 4:
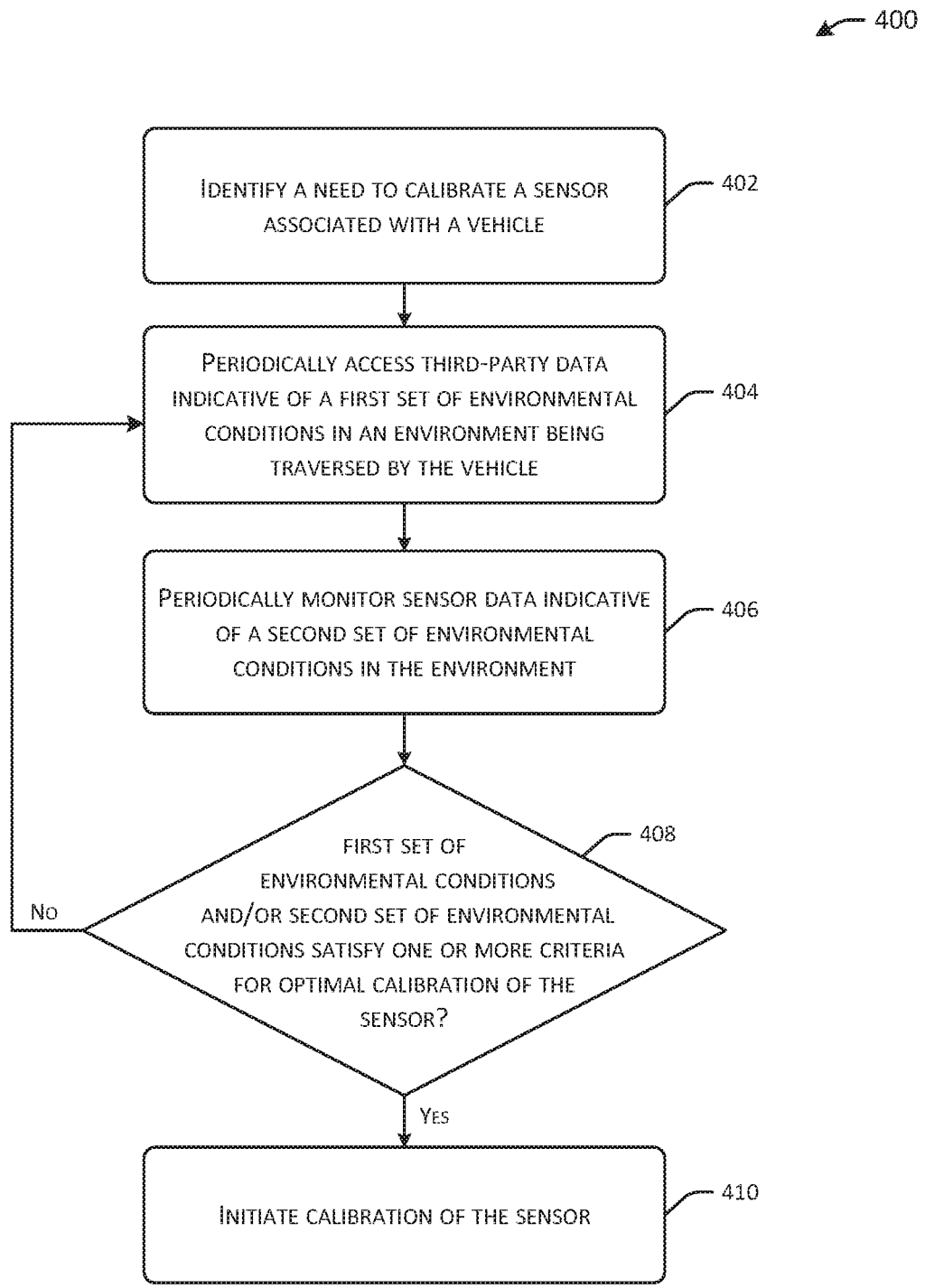
FIG. 4 is a process flow diagram of an illustrative method for identifying a set of environmental conditions relating to an environment being traversed by a vehicle and determining whether the environmental conditions are optimal for initiating calibration of a sensor of the vehicle in accordance with an example embodiment of the invention.

FIG. 2 is a hybrid data flow and block diagram illustrating calibration of a first vehicle sensor such as a LiDAR via a pre-calibrated second sensor such as a GPS IMU using static objects detected in an environment being traversed by a vehicle in accordance with an example embodiment of the invention. FIG. 3 is a process flow diagram of an illustrative method 300 for calibrating a first vehicle sensor via a pre-calibrated second sensor using static objects detected in an environment being traversed by a vehicle in accordance with an example embodiment of the invention. FIG. 4 is a process flow diagram of an illustrative method 400 for identifying a set of environmental conditions relating to an environment being traversed by a vehicle and determining whether the environmental conditions are optimal for initiating calibration of a sensor of the vehicle in accordance with an example embodiment of the invention. Each of FIGS. 3 and 4 will be described in conjunction with FIG. 2 hereinafter.

Each operation of any of the methods 300, 400, and/or 500 described herein can be performed by one or more of the engines/program modules depicted in FIG. 2 or 6, whose operation will be described in more detail hereinafter. These engines/program modules can be implemented in any combination of hardware, software, and/or firmware. In certain example embodiments, one or more of these engines/program modules can be implemented, at least in part, as software and/or firmware modules that include computer-executable instructions that when executed by a processing circuit cause one or more operations to be performed. In example embodiments, these engines/program modules may be customized computer-executable logic implemented within a customized computing machine such as a customized FPGA or ASIC. A system or device described herein as being configured to implement example embodiments of the invention can include one or more processing circuits, each of which can include one or more processing units or cores. Computer-executable instructions can include computer-executable program code that when executed by a processing core can cause input data contained in or referenced by the computer-executable program code to be accessed and processed by the processing core to yield output data.

Referring first to FIG. 2, a vehicle 202 is depicted. The vehicle 202 may be a particular implementation of the vehicle 102, for example. The vehicle 202 can be dispatched as it typically would be within an environment. More specifically, the vehicle 202 may traverse one or more road segments that include any number of linear portions and/or non-linear portions having any degree of curvature, as described in reference to the vehicle 102. Further, while a direction of travel 212 of the vehicle 202 is depicted in FIG. 2 as being substantially linear, it should be appreciated that the vehicle 202 may travel in accordance with any of a range of permissible directions of travel along a roadway including making any number of turns, reversals of travel direction, deviations from a linear travel direction, or the like.

The environment traversed by the vehicle 202 may include various static objects such as various types of signage 210 (e.g., signage present on the side of a roadway; signage extending over or above the roadway; etc.). The signage encountered in the environment being traversed by the vehicle 202 may vary in size, height, and shape. In accordance with example embodiments, using detected objects such as detected signage across a range of sizes and heights may result in a faster statistical convergence to a desired calibration accuracy. Various other types of static objects 208 may also be present in the environment and may be used to performing sensor calibration in accordance with example embodiments described herein including, for example, physical structures such as buildings, monuments, landmarks, or the like. In some example embodiments, detected signage may be most desirable to use because of its high degree of variance in size and height and its substantially flat structure. These characteristics of signage may allow for a LiDAR to capture substantially uniform and dense point cloud data representative of the signage.

In example embodiments, the vehicle 202 may include various onboard vehicle sensors. These sensors may include, for example, a LiDAR sensor 204 as well as various other sensors 206. The other sensors 206 may include any of the type of sensors previously described in reference to the sensors 108. Included among the other sensors 206 may be, for example, a pre-calibrated sensor, such as a GPS IMU, via which the LiDAR 204 may be calibrated in accordance with example embodiments of the invention.

The various sensors onboard the vehicle 202 may be provided on an exterior and/or an interior of the vehicle 202. The LiDAR 204 may, for example, be provided on a roof of the vehicle 202. As described with the LiDAR 106, the LiDAR 204 may be configured to periodically perform a 360 degree scan of the surrounding environment. The various onboard vehicle sensors may be physically integrated with the vehicle 202 during manufacture of the vehicle 202 or may be attached or otherwise physically connected to the vehicle 202 subsequent to manufacture of the vehicle 202. The sensors may be communicatively coupled to one or more components (not depicted) of the vehicle 202 such as an ECC of the vehicle 202; an on-board vehicle computer; or the like.

In some example embodiments, the LiDAR 204 may be provided as part of a sensor assembly that also includes one or more cameras. In some example embodiments, the sensor assembly may further include other types of sensors such as GPS receivers, IMUs, or the like. That is, in some example embodiments, the LiDAR 204 and at least some of the other sensors 206 may be provided as part of a combined sensor assembly. The sensor assembly may be positioned, for example, on a roof of the vehicle 202. For instance, in an example configuration, the LiDAR sensor 204 may be centrally located on a roof of the vehicle 202 and surrounded by multiple cameras that are positioned circumferentially around the LiDAR sensor 204. The LiDAR sensor 204 may be configured to generate 3D point cloud data (a set of data points in 3D space) that are representative of target objects that it has illuminated with light during its scan path. In some example embodiments, cameras positioned circumferentially around the LiDAR 204 may capture image data, which may be analyzed using a trained classifier or other machine learning technique to perform object detection/perception to identify and classify objects present in the image data. It should be appreciated that the above-described configuration is merely illustrative and that any number of LiDARs and/or other sensors/sensor assemblies may be provided on-board the vehicle 202.

Referring now to FIG. 3 in conjunction with FIG. 2, at block 302 of the method 300, as the vehicle 202 traverses the environment, object perception capabilities may be used to detect and identify, at block 302 of the method 300, a static object encountered by the vehicle 202. The static object that is detected may be, for example, signage 210 present in the environment or another type of static object such as a physical structure 208 (e.g., a building, a monument, etc.). In example embodiments, an object perception engine 216 may execute a machine learning algorithm (e.g., a classifier) that is trained to identify and classify objects present in image data 232 captured by one or more image sensors, for example.

At block 304 of the method 300, a calibration engine 218 may identify a global coordinate system. The global coordinate system may be a coordinate system to which a first sensor (e.g., the LiDAR 204) will be calibrated according to the example method 300 and to which a second sensor (e.g., a GPS IMU), that is used as a basis for calibrating the first sensor, has already been calibrated. In example embodiments, the global coordinate system may provide an absolute reference frame in which static objects, for example, have absolute locations with respect an origin of the global coordinate system that are not dependent on a reference frame of an observer of the objects.

At block 306 of the method 300, a first vehicle sensor requiring calibration (e.g., the LiDAR 204) may capture point cloud data 214 corresponding to the static object detected in the environment at block 302, such as a detected sign 210. In some example embodiments, the point cloud data 214 captured at block 306 may include multiple sets of points cloud data representative of the detected static object, where each point cloud data set corresponds to a different relative distance and/or angle between the vehicle 202 and the detected static object. That is, as the vehicle 202 traverses the environment, the LiDAR 204 may continually capture point cloud data 214 representative of light pulses emitted from the LiDAR 204 and reflected back from the static object as the vehicle 202 moves closer to the detected static object. A calibration process may then proceed with respect to the captured point cloud data 214 to calibrate the LiDAR 204 via a second pre-calibrated sensor such as a GPS IMU.

As part of the calibration process, at block 308 of the method 300, the calibration engine 218 may determine a first transformation matrix from a first local coordinate system of the LiDAR sensor 204 to a second local coordinate system of the pre-calibrated GPS IMU, for example. Determining the first transformation matrix may include determining at least one rotational component and at least one translational component of the first transformation matrix. Because the second sensor (e.g., a GPS IMU) has already been calibrated to the global coordinate system identified at block 304, a second transformation matrix from a local coordinate system of the second sensor to the global coordinate system is known. Accordingly, application of the first transformation matrix results in conversion of a location of the detected static object (e.g., represented by corresponding captured point cloud data 214) in the local coordinate system of the first sensor (e.g., the LiDAR 204) to a corresponding location in the local coordinate system of the second sensor (e.g., the GPS IMU). Then, application of the second transformation matrix results in conversion of the corresponding location in the local coordinate system of the second sensor to a location of the detected static object in the global coordinate system.

At block 310 of the method 300, the calibration engine 218 may determine whether the first transformation matrix results in a calibration of the first sensor (e.g., LiDAR 204) that is within a desired calibration accuracy threshold. More specifically, in example embodiments, the calibration engine 218 may determine whether a calibration error for the first sensor, as represented, for example, by a deviation between a current determined location of the static object (detected at block 302) in the global coordinate system and a prior determined location of the detected static object in the global coordinate system, is less than an acceptable calibration error threshold. A current determined location of the detected static object in the global coordinate system may be obtained by first applying the first transformation matrix to a location of the static object in the local coordinate system of the first sensor (e.g., the LiDAR 204) being calibrated to obtain a corresponding location of the static object in the local coordinate system of the pre-calibrated second sensor (e.g., a GPS IMU), and subsequently applying the known second transformation matrix to the location of the static object in the local coordinate system of the pre-calibrated second sensor, to obtain the location of the static object in the global coordinate system. Similarly, the prior determined location of the static object in the global coordinate system may be obtained by application of a prior iteration of the first transformation matrix first followed by application of the known second transformation matrix. In some example embodiments, the operation at block 308 may (at least initially) include determining at least two iterations of the first transformation matrix in order to perform the determination at block 310.

In response to a positive determination at block 310, the calibration process may end, as a desired calibration accuracy for the LiDAR 204 has been achieved. The current iteration of the first transformation matrix may thus serve as the final transformation matrix 230 for transforming an object location in the local coordinate system of the LiDAR 204 to a corresponding location in the local coordinate system of the second sensor (e.g., the GPS IMU), which in turn, is transformed to a location in the global coordinate system by the second transformation matrix that is known based on the pre-calibration of the second sensor.

On the other hand, in response to a negative determination at block 310, the method 300 may proceed to block 312, where an additional static object may be detected in the environment being traversed by the vehicle 202, and additional point cloud data corresponding to the additional detected static object may be captured by the LiDAR 204. Then, at block 314 of the method 300, the calibration engine 218 may redetermine the first transformation matrix with respect to the additional point cloud data. The method 300 may then return to block 310, where the calibration engine 218 may again determine whether a desired calibration accuracy has been achieved. The method 300 may proceed in this fashion with an iterative redetermination of the first transformation matrix until a desired calibration accuracy for the first sensor (e.g., the LiDAR 204) is achieved. That is, in example embodiments, the first transformation matrix is iteratively redetermined with respect to multiple detected static objects in the environment being traversed by the vehicle 202 until a calibration accuracy is achieved for the first sensor (e.g., the LiDAR 204) that is within a desired calibration accuracy threshold.

While not explicitly depicted in FIG. 3, it should be appreciated that, in some example embodiments, the operations at block 308 may include iterative redetermination of the first transformation matrix with respect to multiple sets of point cloud data corresponding to the same detected static object, and the determination at block 310 may be made with respect to multiple iterations of the first transformation matrix determined with respect to the same detected static object. Stated another way, as the vehicle 202 traverses the environment, the first sensor being calibrated (e.g., the LiDAR 204) may capture multiple sets of point cloud data representative of a particular detected static object in the environment from various relative distances and perspectives between the first sensor and the static object. The first transformation matrix may be iteratively redetermined for each such point cloud data set, and successive iterative calculations of the first transformation matrix with respect to the same detected static object may be evaluated at block 310 to determine if a desired calibration accuracy has been achieved. With each iterative redetermination of the first transformation matrix, an improved alignment between consecutively captured point cloud data corresponding to the detected static object is achieved, thereby indicating improved accuracy of the calibration of the first sensor to the global coordinate system. In some example embodiments, the desired calibration accuracy may not be achievable based on the iterative redetermination of the first transformation matrix with respect to point cloud data sets corresponding to the same detected static object, in which case, the calibration process may continue with the iterative redetermination of the first transformation matrix with respect to point cloud data sets corresponding to one or more additional detected static objects. In example embodiments, the greater the variance in shapes, sizes, and/or heights of the detected static objects based on which the sensor calibration is performed, the faster the statistical convergence to a calibration accuracy that is within the desired calibration accuracy threshold.

Referring now to FIG. 4 in conjunction with FIG. 2, at block 402 of the method 400, a calibration initiation determination engine 220 may identify a need to calibrate a vehicle sensor (e.g., the LiDAR 204). In some example embodiments, the LiDAR 204 may require initial calibration. In other example embodiments, the LiDAR 204 may need to be recalibrated, as determined by a calibration verification process described, for example, later in this disclosure in reference to the example method 500 depicted in FIG. 5.

At block 404 of the method 400, the calibration initiation determination engine 220 may periodically access third-party data 224 indicative of a first set of environmental conditions relating to an environment being traversed by the vehicle 202. The third-party data 224 may be retrieved, for example, from one or more datastores 222. The third-party data 224 may include, for example, weather data; time of day data; data indicative of a density of static objects in the environment and/or other characteristics of static objects in the environment; and so forth. The weather data may indicate, for example, various weather-related conditions present in the environment such as temperature; climate conditions (e.g., whether there is any precipitation, and if so, the amount of precipitation, visibility conditions, wind speeds, cloud coverage, etc.); and so forth. The time of day data may indicate a specific time of day, which may be correlated to an expected level of visibility of static objects in the environment. For example, static objects may be more visible at times of days when the amount of sunlight is expected to be greatest. The data indicative of the density and/or other characteristics of static objects in the environment may include data indicative of a total number of static objects present in a defined region of the environment; data indicative of a number of static objects having an optimal size or shape in he defined region (e.g., signage may be more desirable for sensor calibration than trees due to its uniform shape); data indicative of a degree of variance in height and/or shape of static objects; and so forth. It should be appreciated that the above examples of the third-party data 224 are merely illustrative and not exhaustive.

At block 406 of the method 400, the calibration initiation determination engine 220 may periodically monitor sensor data 226 captured by one or more of the sensors 206. The sensor data 226 may be indicative of a second set of environmental conditions in the environment being traversed by the vehicle 202. The sensor data 224 may include, for example, data captured by a moisture sensor, a heat sensor, a vibration sensor, or the like. The moisture data may be indicative of a level of moisture near the sensor requiring calibration or recalibration (e.g., the LiDAR 204); the heat data may be indicative of an amount of heat in or near the LiDAR 204; the vibration data may be indicative of a level of vibration of the vehicle 202 generally, the LiDAR 204 specifically, or one or more of the other sensors 206; and so forth. In some example embodiments, the sensor data 224 may also include data indicative of a quality of a GPS signal received by the GPS device whose IMU may serve as a basis for calibration of the LiDAR 204; an amount of vibration detected by the GPS IMU; or the like.

At block 408 of the method 400, the calibration initiation determination engine 220 may determine whether the third-party data 224 indicative of the first set of environmental conditions and/or the sensor data 226 indicative of the second set of environmental conditions satisfy one or more criteria for optimal calibration of the vehicle sensor (e.g., the LiDAR 204). For example, the criteria for optimal calibration of the vehicle may specify that the calibration process should be initiated when a specific set of environmental conditions are present such as during a particular time of day when an amount of sunlight is expected to be greatest; during weather conditions that enable at least a threshold level of visibility of static objects in the environment (e.g., below a threshold level of precipitation, below a threshold fog level, etc.); during environmental conditions that mitigate the likelihood that the ability of the LiDAR 204 to capture high-resolution point cloud data is impaired (e.g., below a threshold wind speed around the LiDAR 204, below, below a threshold temperature in or around the LiDAR 204 enclosure, below a threshold moisture level in or around the LiDAR 204 enclosure, below a threshold vibration level, etc.); and so forth. In some example embodiments, the criteria for optimal calibration of the LiDAR 204 may additionally or alternatively require at least a threshold quality for the GPS signal received by the GPS receiver whose IMU may serve a basis for calibrating the LiDAR 204. It should be appreciated that the above-described examples of optimal criteria for initiating calibration or recalibration of the LiDAR 204 are merely illustrative and not exhaustive.

In response to a positive determination at block 406, the calibration initiation determination engine 220 may send a calibration initiation signal 228 to the calibration engine 218 to initiate calibration or recalibration of the LiDAR 204 via a second sensor such as a GPS IMU. On the other hand, in response to a negative determination at block 406, the method 400 may proceed iteratively from block 404, where additional environmental condition data (e.g., third-party data 224, sensor data 226, etc.) may be periodically accessed at blocks 404 and 406 and evaluated against the criteria for optimal sensor calibration at block 408.

Figure 5:
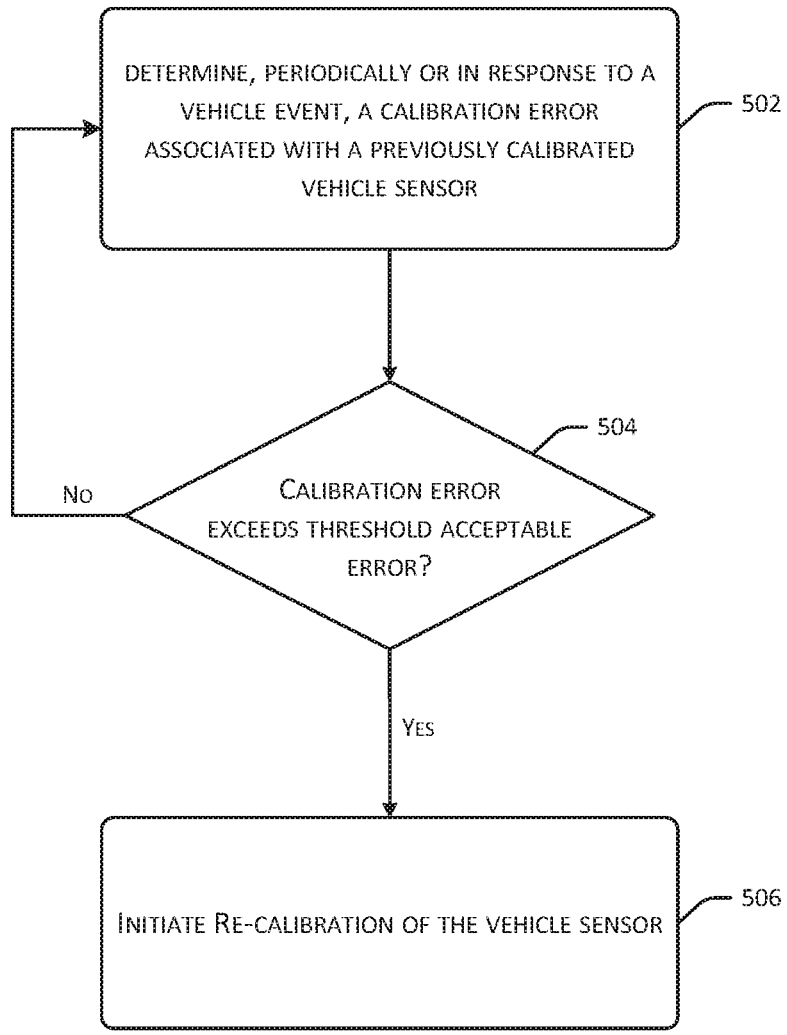
FIG. 5 is a process flow diagram of an illustrative method for performing calibration verification for a vehicle sensor in accordance with an example embodiment of the invention.

FIG. 5 is a process flow diagram of an illustrative method 500 for performing calibration verification for a vehicle sensor in accordance with an example embodiment of the invention. In some example embodiments, after the first sensor (e.g., the LiDAR 204) is calibrated via a second sensor (e.g., a GPS IMU), the method 500 may be performed with respect to the first sensor to ensure that a calibration accuracy of the first sensor is still within the desired calibration accuracy threshold.

At block 502 of the method 500, the calibration verification process may be triggered in response to a vehicle event involving the vehicle 202 and/or may be performed periodically subsequent to the initial calibration of the first sensor. Vehicle events that may trigger the calibration verification include, for example, a vibrational event that causes a threshold amount of vibration of the vehicle 202, the first sensor, and/or the second sensor via which the first sensor was calibrated (e.g., driving over a speed bump or pothole); at least a threshold amount of force being exerted on the first sensor as determined from data captured by a force/pressure sensor (e.g., operating the vehicle 202 under high wind conditions); at least a threshold amount of heat present in or near the first sensor as determined by data captured by a heat sensor (e.g., operating the vehicle 202 under high heat conditions); or the like. In some example embodiments, calibration verification of the first sensor may occur periodically after a threshold amount of time has passed since the initial calibration or since a last calibration verification; after the vehicle 202 has traversed a threshold distance; after the vehicle 202 has been operated for a threshold amount of time; and so forth.

In response to the triggering vehicle event or based on a predetermined periodicity, a calibration error associated with the first sensor (e.g., the LiDAR 204) may be determined at block 502. As previously noted, determining the calibration error may include, for example, determining a deviation between alignment of different sets of point cloud data representative of a detected static object in the environment of the vehicle 202 and captured at different times (e.g., at different relative distances/perspectives between the vehicle 202 and the detected static object). Stated another way, the calibration error for the first sensor (e.g., the LiDAR 204) may be determined based on a deviation between a determined location of the detected static object within a global coordinate system (as determined from application of a current iteration of the first transformation matrix to perform a transformation from a local coordinate system of the first sensor to a local coordinate system of a second pre-calibrated sensor (e.g., a GPS IMU) followed by application of a second known transformation matrix to perform a transformation from the local coordinate system of the second sensor to the global coordinate system) and a prior determined location of the detected static object within the global coordinate system (as determined from application of a prior iteration of the first transformation matrix followed by application of the second known transformation matrix).

At 504 of the method 500, a determination may be made as to whether the determined calibration error exceeds a threshold acceptable calibration error. This determination may involve determining whether the first sensor (e.g., the LiDAR 204), despite the calibration error, maintains a calibration accuracy that is within the desired calibration accuracy threshold. If the calibration error exceeds the threshold acceptable calibration error (a positive determination at block 504), re-calibration of the first sensor may be initiated at block 506 of the method 500 using the techniques described herein (e.g., the example method 300 of FIG. 3). That is, the first sensor may be re-calibrated via the second pre-calibrated sensor based on which the initial calibration of the first sensor was performed. On the other hand, in response to a negative determination at block 504, the method 500 may proceed iteratively from block 502.

Hardware Implementation

Figure 6:
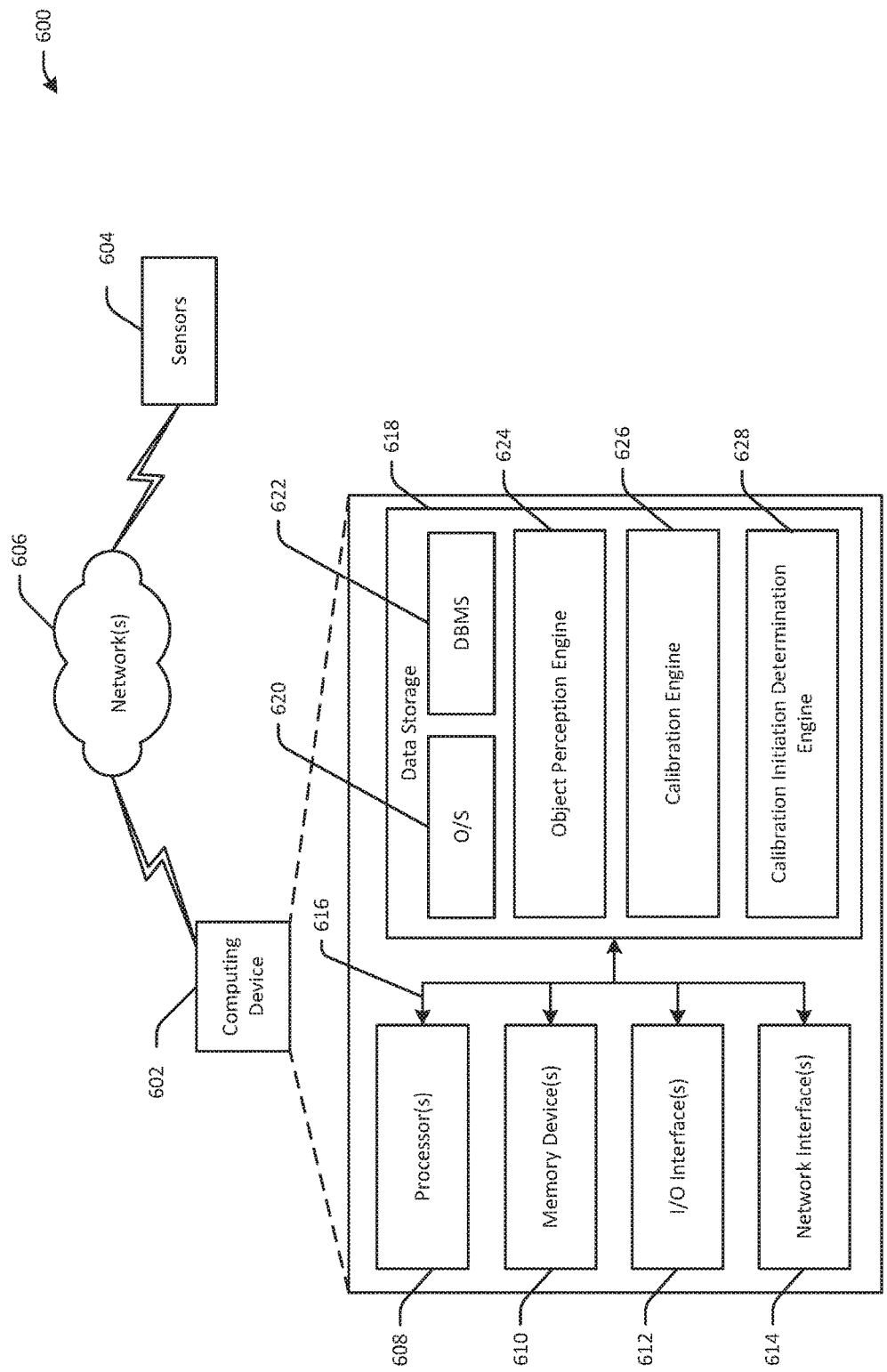
FIG. 6 is a schematic block diagram illustrating an example networked architecture configured to implement example embodiments of the invention.

FIG. 6 is a schematic block diagram illustrating an example networked architecture 600 configured to implement example embodiments of the invention. The networked architecture 600 can include one or more special-purpose computing devices 602 communicatively coupled via one or more networks 606 to various sensors 604. The sensors 604 may include any of the example types of on-board vehicle sensors previously described including, without limitation, LiDAR sensors (e.g. LiDAR 106, LiDAR 204), radars, cameras, GPS receivers, sonar-based sensors, ultrasonic sensors, IMUs, accelerometers, gyroscopes, magnetometers, FIR sensors, and so forth. In example embodiments, the sensors 604 may include on-board sensors provided on an exterior or in an interior of a vehicle (e.g., vehicle 102, vehicle 202) such as an autonomous vehicle. The special-purpose computing device(s) 602 may include devices that are integrated with a vehicle and may receive sensor data from the sensors 604 via a local network connection (e.g., WiFi, Bluetooth, Dedicated Short Range Communication (DSRC), or the like). In other example embodiments, the special-purpose computing device(s) 602 may be provided remotely from a vehicle and may receive the sensor data from the sensors 604 via one or more long-range networks.

The special-purpose computing device(s) 602 may be hard-wired to perform the techniques of example embodiments of the invention; may include circuitry or digital electronic devices such as one or more ASICs or FPGAs that are persistently programmed to perform the techniques; and/or may include one or more hardware processors programmed to perform the techniques pursuant to program instructions in firmware, memory, other storage, or a combination thereof. The special-purpose computing device(s) 602 may also combine custom hard-wired logic, ASICs, or FPGAs with custom programming to accomplish the techniques. In other example embodiments, one or more sensors 604 (e.g., a LiDAR) may include a respective customized processing unit (e.g., an ASIC, an FPGA, etc.) configured to perform techniques according to example embodiments of the invention. The special-purpose computing device(s) 602 may be desktop computer systems, server computer systems, portable computer systems, handheld devices, networking devices or any other device or combination of devices that incorporate hard-wired and/or programmed logic to implement the techniques.

The special-purpose computing device(s) may be generally controlled and coordinated by operating system software 620, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device(s) 602 may be controlled by a proprietary operating system. The operating system software 620 may control and schedule computer processes for execution; perform memory management; provide file system, networking, and I/O services; and provide user interface functionality, such as a graphical user interface ("GUI").

While the computing device(s) 602 and/or the sensors 604 may be described herein in the singular, it should be appreciated that multiple instances of any such component can be provided and functionality described in connection any particular component can be distributed across multiple instances of such a component. In certain example embodiments, functionality described herein in connection with any given component of the architecture 600 can be distributed among multiple components of the architecture 600. For example, at least a portion of functionality described as being provided by a computing device 602 may be distributed among multiple such computing devices 602.

The network(s) 606 can include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 606 can have any suitable communication range associated therewith and can include, for example, global networks (e.g., the Internet), metropolitan area networks (MANs), wide area networks (WANs), local area networks (LANs), or personal area networks (PANs). In addition, the network(s) 606 can include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 602 can include one or more processors (processor(s)) 608, one or more memory devices 610 (generically referred to herein as memory 610), one or more input/output ("I/O") interface(s) 612, one or more network interfaces 616, and data storage 618. The computing device 602 can further include one or more buses 616 that functionally couple various components of the computing device 602. The data storage may store one or more engines, program modules, components, or the like including, without limitation, an object perception engine 624; a calibration engine 626; and a calibration initiation determination engine 628. Each of the engines/components depicted in FIG. 6 may include logic for performing any of the processes or tasks described earlier in connection with correspondingly named engines/components. In certain example embodiments, any of the depicted engines/components may be implemented in hardwired circuitry within digital electronic devices such as one or more ASICs or FPGAs that are persistently programmed to perform corresponding techniques.

The bus(es) 616 can include at least one of a system bus, a memory bus, an address bus, or a message bus, and can permit the exchange of information (e.g., data (including computer-executable code), signaling, etc.) between various components of the computing device 602. The bus(es) 616 can include, without limitation, a memory bus or a memory controller, a peripheral bus, an accelerated graphics port, and so forth. The bus(es) 616 can be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 610 can include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, can include non-volatile memory. In certain example embodiments, volatile memory can enable faster read/write access than non-volatile memory. However, in certain other example embodiments, certain types of non-volatile memory (e.g., FRAM) can enable faster read/write access than certain types of volatile memory.

In various implementations, the memory 610 can include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 610 can include main memory as well as various forms of cache memory such as instruction cache(s), data cache(s), translation lookaside buffer(s) (TLBs), and so forth. Further, cache memory such as a data cache can be a multi-level cache organized as a hierarchy of one or more cache levels (L1, L2, etc.). In example embodiments, the memory 610 may include the data storage 106(1)-106(P) and/or the data storage 120 depicted in FIG. 1. Alternatively, the data storage 106(1)-106(P) may be hard disk storage forming part of the data storage 618 and/or the data storage 120 may be a form of RAM or cache memory that is provided as part of the FOV semantics computing machine 626 itself.

The data storage 618 can include removable storage and/or non-removable storage including, but not limited to, magnetic storage, optical disk storage, and/or tape storage. The data storage 618 can provide non-volatile storage of computer-executable instructions and other data. The memory 610 and the data storage 618, removable and/or non-removable, are examples of computer-readable storage media (CRSM) as that term is used herein. The data storage 618 can store computer-executable code, instructions, or the like that can be loadable into the memory 610 and executable by the processor(s) 608 to cause the processor(s) 608 to perform or initiate various operations. The data storage 618 can additionally store data that can be copied to memory 610 for use by the processor(s) 608 during the execution of the computer-executable instructions. Moreover, output data generated as a result of execution of the computer-executable instructions by the processor(s) 608 can be stored initially in memory 610 and can ultimately be copied to data storage 618 for non-volatile storage.

More specifically, the data storage 618 can store one or more operating systems (O/S) 620 and one or more database management systems (DBMS) 622 configured to access the memory 610 and/or one or more external datastore(s) (not depicted) potentially via one or more of the networks 606. In addition, the data storage 618 may further store one or more program modules, applications, engines, computer-executable code, scripts, or the like. For instance, any of the engines/components depicted in FIG. 6 may be implemented as software and/or firmware that includes computer-executable instructions (e.g., computer-executable program code) loadable into the memory 610 for execution by one or more of the processor(s) 608 to perform any of the techniques described herein.

Although not depicted in FIG. 6, the data storage 618 can further store various types of data utilized by engines/components of the computing device 602. Such data may include, without limitation, sensor data, transformation matrix data, or the like. Any data stored in the data storage 618 can be loaded into the memory 610 for use by the processor(s) 608 in executing computer-executable program code. In addition, any data stored in the data storage 618 can potentially be stored in one or more external datastores that are accessible via the DBMS 622 and loadable into the memory 610 for use by the processor(s) 608 in executing computer-executable instructions/program code.

The processor(s) 608 can be configured to access the memory 610 and execute computer-executable instructions/program code loaded therein. For example, the processor(s) 608 can be configured to execute computer-executable instructions/program code of the various engines/components of the computing device 602 to cause or facilitate various operations to be performed in accordance with one or more embodiments of the invention. The processor(s) 608 can include any suitable processing unit capable of accepting data as input, processing the input data in accordance with stored computer-executable instructions, and generating output data. The processor(s) 608 can include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 608 can have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 608 can be made capable of supporting any of a variety of instruction sets.

Referring now to other illustrative components depicted as being stored in the data storage 618, the O/S 620 can be loaded from the data storage 618 into the memory 610 and can provide an interface between other application software executing on the computing device 602 and hardware resources of the computing device 602. More specifically, the O/S 620 can include a set of computer-executable instructions for managing hardware resources of the computing device 602 and for providing common services to other application programs. In certain example embodiments, the O/S 620 can include or otherwise control execution of one or more of the engines/program modules stored in the data storage 618. The O/S 620 can include any operating system now known or which can be developed in the future including, but not limited to, any server operating system, any mainframe operating system, or any other proprietary or non-proprietary operating system.

The DBMS 622 can be loaded into the memory 610 and can support functionality for accessing, retrieving, storing, and/or manipulating data stored in the memory 610, data stored in the data storage 618, and/or data stored in external datastore(s) (not shown in FIG. 6). The DBMS 622 can use any of a variety of database models (e.g., relational model, object model, etc.) and can support any of a variety of query languages. The DBMS 622 can access data represented in one or more data schemas and stored in any suitable data repository. Datastore(s) that may be accessible by the computing device 602 via the DBMS 622, can include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 602, the input/output (I/O) interface(s) 612 can facilitate the receipt of input information by the computing device 602 from one or more I/O devices as well as the output of information from the computing device 602 to the one or more I/O devices. The I/O devices can include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components can be integrated into the computing device 602 or can be separate therefrom. The I/O devices can further include, for example, any number of peripheral devices such as data storage devices, printing devices, and so forth.

The I/O interface(s) 612 can also include an interface for an external peripheral device connection such as universal serial bus (USB), FireWire, Thunderbolt, Ethernet port or other connection protocol that can connect to one or more networks. The I/O interface(s) 612 can also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 602 can further include one or more network interfaces 614 via which the computing device 602 can communicate with any of a variety of other systems, platforms, networks, devices, and so forth. The network interface(s) 614 can enable communication, for example, with the sensors 606 and/or one or more other devices via one or more of the network(s) 606. In example embodiments, the network interface(s) 614 provide a two-way data communication coupling to one or more network links that are connected to one or more of the network(s) 606. For example, the network interface(s) 614 may include an integrated services digital network (ISDN) card, a cable modem, a satellite modem, or a modem to provide a data communication connection to a corresponding type of telephone line. As another non-limiting example, the network interface(s) 614 may include a local area network (LAN) card to provide a data communication connection to a compatible LAN (or a wide area network (WAN) component to communicate with a WAN). Wireless links may also be implemented. In any such implementation, the network interface(s) 614 may send and receive electrical, electromagnetic, or optical signals that carry digital data streams representing various types of information.

A network link typically provides data communication through one or more networks to other data devices. For example, a network link may provide a connection through a local network to a host computer or to data equipment operated by an Internet Service Provider (ISP). The ISP, in turn, may provide data communication services through the world wide packet data communication network now commonly referred to as the "Internet". Local networks and the Internet both use electrical, electromagnetic, or optical signals that carry digital data streams. The signals through the various network(s) 606 and the signals on network links and through the network interface(s) 614, which carry the digital data to and from the computing device 602, are example forms of transmission media. In example embodiments, the computing device 602 can send messages and receive data, including program code, through the network(s) 606, network links, and network interface(s) 614. For instance, in the Internet example, a server might transmit a requested code for an application program through the Internet, the ISP, a local network, and a network interface 614. The received code may be executed by a processor 608 as it is received, and/or stored in the data storage 618, or other non-volatile storage for later execution.

It should be appreciated that the engines depicted in FIG. 6 as part of the computing device 602 are merely illustrative and not exhaustive. In particular, functionality can be modularized in any suitable manner such that processing described as being supported by any particular engine can alternatively be distributed across multiple engines, program modules, components, or the like, or performed by a different engine, program module, component, or the like. Further, one or more depicted engines may or may not be present in certain embodiments, while in other embodiments, additional engines not depicted can be present and can support at least a portion of the described functionality and/or additional functionality. In addition, various engine(s), program module(s), script(s), plug-in(s), Application Programming Interface(s) (API(s)), or any other suitable computer-executable code hosted locally on the computing device 602 and/or hosted on other computing device(s) (e.g., 602) accessible via one or more of the network(s) 606, can be provided to support functionality provided by the engines depicted in FIG. 6 and/or additional or alternate functionality. In addition, engines that support functionality described herein can be implemented, at least partially, in hardware and/or firmware and can be executable across any number of computing devices 602 in accordance with any suitable computing model such as, for example, a client-server model, a peer-to-peer model, and so forth.

It should further be appreciated that the computing device 602 can include alternate and/or additional hardware, software, and/or firmware components beyond those described or depicted without departing from the scope of the invention. More particularly, it should be appreciated that software, firmware, and/or hardware components depicted as forming part of the computing device 602 are merely illustrative and that some components may or may not be present or additional components may be provided in various embodiments. It should further be appreciated that each of the engines depicted and described represent, in various embodiments, a logical partitioning of supported functionality. This logical partitioning is depicted for ease of explanation of the functionality and may or may not be representative of the structure of software, hardware, and/or firmware for implementing the functionality.

In general, the terms engine, program module, or the like, as used herein, refer to logic embodied in hardware, firmware, and/or circuitry, or to a collection of software instructions, possibly having entry and exit points, written in a programming language, such as, for example, Java, C or C++. A software engine/module may be compiled and linked into an executable program, installed in a dynamic link library, or may be written in an interpreted programming language such as, for example, BASIC, Perl, or Python. It will be appreciated that software engines/modules may be callable from other engines/modules or from themselves, and/or may be invoked in response to detected events or interrupts. Software engines/modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. "Open source" software refers to source code that can be distributed as source code and/or in compiled form, with a well-publicized and indexed means of obtaining the source, and optionally with a license that allows modifications and derived works. Software instructions may be embedded in firmware and stored, for example, on flash memory such as erasable programmable read-only memory (EPROM). It will be further appreciated that hardware modules/engines may include connected logic units, such as gates and flip-flops, and/or may be further include programmable units, such as programmable gate arrays or processors.

Example embodiments are described herein as including engines or program modules. Such engines/program modules may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a stand-alone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a field programmable gate array (FPGA) or an application specific integrated circuit (ASIC). A hardware engine may also include programmable logic or circuitry that is temporarily configured by software to perform certain operations. For example, a hardware engine may include a general-purpose processor or other programmable processor configured by software, in which case, the configured processor becomes a specific machine uniquely tailored to perform the configured functions and no longer constitute general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the term "engine" or "program module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware engines are temporarily configured (e.g., programmed), each of the hardware engines need not be configured or instantiated at any one instance in time. For example, where a hardware engine includes a general-purpose processor configured by software to become a special-purpose processor, the general-purpose processor may be configured as respectively different special-purpose processors (e.g., comprising different hardware engines) at different times. Software accordingly can configure a particular processor or processors, for example, to constitute a particular hardware engine at a given instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute an implementation of a hardware engine. Similarly, the methods described herein may be at least partially processor-implemented, with a particular processor or processors being an example of hardware. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations of example methods described herein may be distributed among multiple processors, not only residing within a single machine, but deployed across a number of machines. In some example embodiments, the processors may be located in a single geographic location (e.g., within a home environment, an office environment, or a server farm). In other example embodiments, the processors may be distributed across a number of geographic locations.

The present invention may be implemented as a system, a method, and/or a computer program product. The computer program product may include a computer readable storage medium (or media) having computer readable program instructions embodied thereon for causing a processor to carry out aspects of the present invention.

The computer readable storage medium is a form of non-transitory media, as that term is used herein, and can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. The computer readable storage medium, and non-transitory media more generally, may include non-volatile media and/or volatile media. A non-exhaustive list of more specific examples of a computer readable storage medium includes the following: a portable computer diskette such as a floppy disk or a flexible disk; a hard disk; a random access memory (RAM), a read-only memory (ROM), an erasable programmable read-only memory (EPROM or Flash memory), a static random access memory (SRAM), or any other memory chip or cartridge; a portable compact disc read-only memory (CD-ROM); a digital versatile disk (DVD); a memory stick; a solid state drive; magnetic tape or any other magnetic data storage medium; a mechanically encoded device such as punch-cards or raised structures in a groove having instructions recorded thereon or any physical medium with patterns of holes; any networked versions of the same; and any suitable combination of the foregoing.

Non-transitory media is distinct from transmission media, and thus, a computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Non-transitory media, however, can operate in conjunction with transmission media. In particular, transmission media may participate in transferring information between non-transitory media. For example, transmission media can include coaxial cables, copper wire, and/or fiber optics, including the wires that include at least some of the bus(es) 602. Transmission media can also take the form of acoustic or light waves, such as those generated during radio-wave and infra-red data communications.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider (ISP)). In some embodiments, electronic circuitry including, for example, programmable logic circuitry, FPGAs, or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The various features and processes described above may be used independently of one another or may be combined in various ways. All possible combinations and sub-combinations are intended to fall within the scope of the invention. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed partially, substantially, or entirely concurrently, or the blocks may sometimes be executed in the reverse order, depending upon the functionality involved.

It should be emphasized that many variations and modifications may be made to the above-described embodiments, the elements of which are to be understood as being among other example embodiments of the invention. All such modifications and variations are intended to be included herein within the scope of the invention. While example embodiments of the invention may be referred to herein, individually or collectively, by the term "invention," this is merely for convenience and does not limit the scope of the invention to any single disclosure or concept if more than one is, in fact, disclosed. The foregoing description details certain embodiments of the invention. It will be appreciated, however, that no matter how detailed the foregoing appears in text, the invention can be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

The embodiments illustrated herein are described in sufficient detail to enable those skilled in the art to practice the teachings disclosed. Other embodiments may be used and derived therefrom, such that structural and logical substitutions and changes may be made without departing from the scope of the invention. The Detailed Description, therefore, is not to be taken in a limiting sense, and the scope of various embodiments is defined only by the appended claims, along with the full range of equivalents to which such claims are entitled.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

As used herein, the term "or" may be construed in either an inclusive or exclusive sense. Moreover, plural instances may be provided for resources, operations, or structures described herein as a single instance. Additionally, boundaries between various resources, operations, program modules, engines, and/or datastores are somewhat arbitrary, and particular operations are illustrated in a context of specific illustrative configurations. Other allocations of functionality are envisioned and may fall within a scope of various embodiments of the invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the invention as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

What is claimed is:

1. A computer-implemented method for calibrating a first sensor associated with a vehicle using detected objects, the method comprising:
    detecting static objects in an environment being traversed by the vehicle;
    determining a degree of variance in heights and shapes of static objects;
    in response to determining that the degree of variance exceeds a threshold degree, capturing, via the first sensor, point cloud data, at least a portion of the point cloud data being associated with the detected static object; and
    calibrating, with respect to the point cloud data, the first sensor to a global coordinate system via a second sensor associated with the vehicle, wherein the second sensor has been pre-calibrated to the global coordinate system.

2. The computer-implemented method of claim 1, wherein calibrating the first sensor to the global coordinate system comprises:
determining a transformation matrix from a first local coordinate system of the first sensor to a second local coordinate system of the second sensor.

3. The computer-implemented method of claim 2, wherein determining the transformation matrix comprises determining at least one rotational component and at least one translational component of the transformation matrix.

4. The computer-implemented method of claim 3, wherein the at least one rotational component and at least one translational component align the at least a portion of the point cloud data with a location of the detected static object within the global coordinate system as a relative position of the vehicle changes with respect to the detected static object.

5. The computer-implemented method of claim 2, wherein calibrating the first sensor comprises determining whether the transformation matrix results in a calibration accuracy for the first sensor that is within a calibration accuracy threshold.

6. The computer-implemented method of claim 5, wherein the transformation matrix is a first transformation matrix, and wherein calibrating the first sensor to the global coordinate system further comprises:
determining, based at least in part on the at least a portion of the point cloud data associated with the detected static object, a location of the detected static object in the first local coordinate system;
applying the first transformation matrix to the location of the detected static object in the first local coordinate system to obtain a corresponding location of the detected static object in the second local coordinate system;
applying a second transformation matrix to the corresponding location of the detected static object in the second local coordinate system to obtain a location of the detected static object in the global coordinate system; and
determining the calibration accuracy of the calibration of the first sensor based at least in part on a deviation between the determined location of the detected static object in the global coordinate system obtained via application of the first transformation matrix and the second transformation matrix and a prior determined location of the detected static object in the global coordinate system obtained via application of the second transformation matrix and a prior iteration of the first transformation matrix.

7. The computer-implemented method of claim 5, wherein determining whether the transformation matrix results in a calibration accuracy for the first sensor that is within a calibration accuracy threshold comprises determining that the calibration accuracy for the first sensor is not within the calibration accuracy threshold, and wherein the at least a portion of the point cloud data associated with the detected static object is a first portion of the point cloud data, the method further comprising:
detecting a second static object in an environment being traversed by the vehicle, wherein a second portion of the point cloud data is associated with the detected second static object;
redetermining the transformation matrix with respect to the second portion of the point cloud data; and
redetermining the calibration accuracy for the first sensor based at least in part on the redetermined transformation matrix.

8. The computer-implemented method of claim 1, further comprising:
determining a calibration error associated with the first sensor subsequent to calibrating the first sensor;
determining that the calibration error exceeds a threshold acceptable calibration error; and
re-calibrating the first sensor responsive, at least in part, to determining that the calibration error exceeds the threshold acceptable calibration error.

9. The computer-implemented method of claim 1, further comprising prior to calibrating the first sensor:
identifying data indicative of a set of environmental conditions in the environment being traversed by the vehicle;
determining that the set of environmental conditions satisfies one or more criteria for optimal calibration of the first sensor; and
initiating the calibrating the first sensor responsive, at least in part, to determining that the set of environmental conditions satisfies the one or more criteria for optimal calibration of the first sensor.

10. The computer-implemented method of claim 1, wherein the first sensor is a light detection and ranging (LiDAR) sensor and the second sensor is an inertial sensor.

11. A system for calibrating a first sensor associated with a vehicle using detected objects, the system comprising:
at least one processor; and
at least one memory storing computer-executable instructions, wherein the at least one processor is configured to access the at least one memory and execute the computer-executable instructions to:
detect static objects in an environment being traversed by the vehicle;
determine a degree of variance in heights and shapes of static objects;
in response to determining that the degree of variance exceeds a threshold degree, capture, via the first sensor, point cloud data, at least a portion of the point cloud data being associated with the detected static object; and
calibrate, with respect to the point cloud data, the first sensor to a global coordinate system via a second sensor associated with the vehicle, wherein the second sensor has been pre-calibrated to the global coordinate system.

12. The system of claim 11, wherein the at least one processor is configured to calibrate the first sensor to the global coordinate system by executing the computer-executable instructions to:
determine a transformation matrix from a first local coordinate system of the first sensor to a second local coordinate system of the second sensor.

13. The system of claim 12, wherein the at least one processor is configured to determine the transformation matrix by executing the computer-executable instructions to determine at least one rotational component and at least one translational component of the transformation matrix.

14. The system of claim 13, wherein the at least one rotational component and at least one translational component align the at least a portion of the point cloud data with a location of the detected static object within the global coordinate system as a relative position of the vehicle changes with respect to the detected static object.

15. The system of claim 12, wherein the at least one processor is configured to calibrate the first sensor by executing the computer-executable instructions to determine whether the transformation matrix results in a calibration accuracy for the first sensor that is within a calibration accuracy threshold.

16. The system of claim 15, wherein the transformation matrix is a first transformation matrix, and wherein the at least one processor is configured to calibrate the first sensor to the global coordinate system by executing the computer-executable instructions to:
determine, based at least in part on the at least a portion of the point cloud data associated with the detected static object, a location of the detected static object in the first local coordinate system;
apply the first transformation matrix to the location of the detected static object in the first local coordinate system to obtain a corresponding location of the detected static object in the second local coordinate system;
apply a second transformation matrix to the corresponding location of the detected static object in the second local coordinate system to obtain a location of the detected static object in the global coordinate system; and
determine the calibration accuracy of the calibration of the first sensor based at least in part on a deviation between the determined location of the detected static object in the global coordinate system obtained via application of the first transformation matrix and the second transformation matrix and a prior determined location of the detected static object in the global coordinate system obtained via application of the second transformation matrix and a prior iteration of the first transformation matrix.

17. The system of claim 15, wherein the at least one processor is configured to determine whether the transformation matrix results in a calibration accuracy for the first sensor that is within a calibration accuracy threshold by executing the computer-executable instructions to determine that the calibration accuracy for the first sensor is not within the calibration accuracy threshold, wherein the at least a portion of the point cloud data associated with the detected static object is a first portion of the point cloud data, and wherein the at least one processor is further configured to execute the computer-executable instructions to:
detect a second static object in an environment being traversed by the vehicle, wherein a second portion of the point cloud data is associated with the detected second static object;
redetermine the transformation matrix with respect to the second portion of the point cloud data; and
redetermine the calibration accuracy for the first sensor based at least in part on the redetermined transformation matrix.

18. The system of claim 11, wherein the at least one processor is further configured to execute the computer-executable instructions to:
determine a calibration error associated with the first sensor subsequent to calibrating the first sensor;
determine that the calibration error exceeds a threshold acceptable calibration error; and
re-calibrate the first sensor responsive, at least in part, to determining that the calibration error exceeds the threshold acceptable calibration error.

19. The system of claim 11, wherein, prior to calibration of the first sensor, the at least one processor is further configured to execute the computer-executable instructions to:
identify data indicative of a set of environmental conditions in the environment being traversed by the vehicle;
determine that the set of environmental conditions satisfies one or more criteria for optimal calibration of the first sensor; and
initiate the calibrating the first sensor responsive, at least in part, to determining that the set of environmental conditions satisfies the one or more criteria for optimal calibration of the first sensor,
wherein the data indicative of the set of environmental conditions comprises at least one of: i) third-party data indicative of one or more of a weather condition, a time of day, or a density of static objects in a portion of the environment or ii) sensor data from at least a third sensor associated with the vehicle, wherein the third sensor comprises one or more of a moisture sensor, a heat sensor, or a vibration sensor.

* * * * *